Feb. 21, 1967  B. G. HAMMONS  3,304,977
BLOOD CONTAINER
Filed Jan. 11, 1965  2 Sheets-Sheet 1
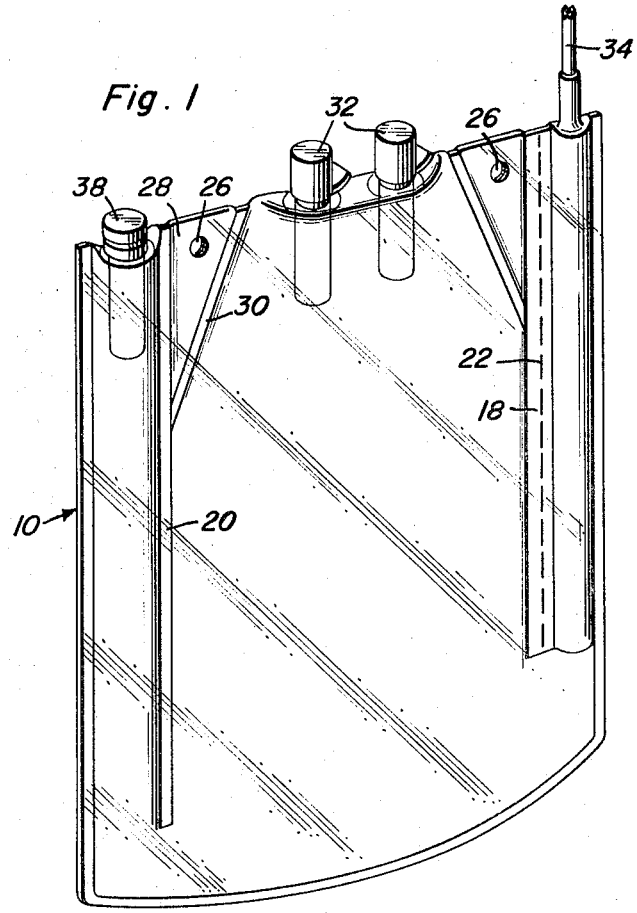
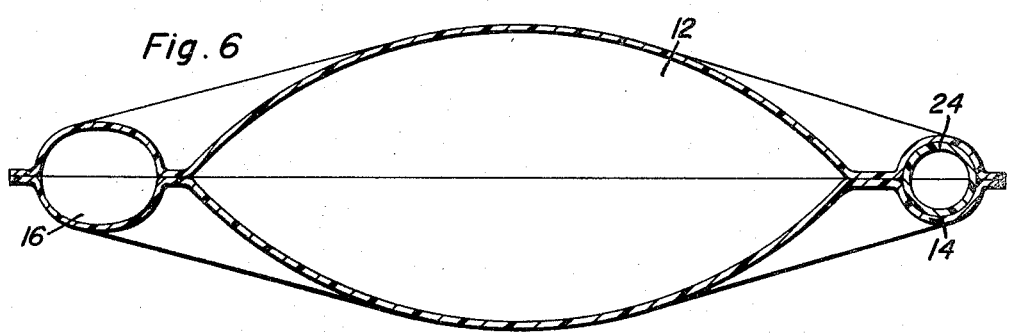
Billy G. Hammons
INVENTOR Feb. 21, 1967  B. G. HAMMONS  3,304,977
BLOOD CONTAINER Filed Jan. 11, 1965  2 Sheets-Sheet 2

Billy G. Hammons
INVENTOR.

BY Clarence A. O'Brien
and Harvey B. Jacobson
Attorneys

United States Patent Office 3,304,977
Patented Feb. 21, 1967

1

3,304,977
BLOOD CONTAINER
Billy G. Hammons, Pinole, Calif., assignor of forty-nine percent to Velikanje, Moore & Countryman, Yakima, Wash., a co-partnership
Filed Jan. 11, 1965, Ser. No. 424,651
1 Claim. (Cl. 150—1)

The present invention is generally concerned with the handling of blood, and more particularly relates to a novel container for receiving and storing blood.

A primary object of the instant invention is to provide a container which, in addition to the main blood storing chamber, also includes integrally formed laboratory and pilot tubes.

In conjunction with the above object, it is also a significant object of the instant invention to provide for an initial communication between the laboratory and pilot tubes and the main chamber so as to allow a simultaneous filling thereof.

Likewise, it is a significant object of the instant invention to provide a device wherein the necessary anti-coagulant will be simultaneously introduced into both the main chamber and the pilot tube, thereby providing a pilot tube for hospital use with anti-coagulant added, the severable tube having no anti-coagulant.

Furthermore, it is an object of the instant invention to provide a blood container which incorporates the laboratory tube, pilot tube and main blood receiving chamber into a single integral unit.

Also, it is a significant object of the instant invention to provide a blood container which is of a simple and economic construction, consisting basically of a clear pliable plastic bag having the seams thereof welded or sealed so as to form one main chamber and two smaller tube-shaped chambers initially containing with each other and subsequently being sealed off from each other so as to provide three independent chambers.

Also, it is an object of the instant invention to provide a blood container having integral laboratory and pilot tubes wherein the laboratory tube is readily severable from the container and incorporates a rigidifying means therein so as to facilitate its handling once removed from the container.

In addition, it is an object of the instant invention to provide for a simplified method of receiving and handling blood.

These together with other objects and advantages which will become subsequently apparent reside in the details of construction and operation as more fully hereinafter described and claimed, reference being had to the accompanying drawings forming a part hereof, wherein like numerals refere to like parts throughout, and in which:

FIGURE 1 is a perspective view of the device comprising the instant invention;

FIGURE 6 is an enlarged transverse cross-sectional view taken substantially on a plane passing along the line 6—6 in FIGURE 2.

Figure 2:
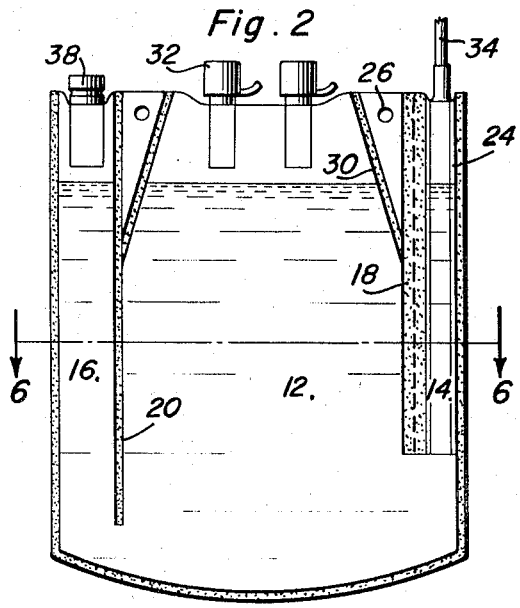
FIGURE 2 is a view of the device after the initial introduction of the blood.

As will be appreciated, once blood is received from a donor and put into a container, it should not be invaded. Thus, inasmuch as it is necessary to initially check and classify the blood soon after taken, as well as immediately prior to its use, it has been the general practice to attach two small tubes to the outside of a conventional blood receiving container, these tubes being separately filled either before or after the filling of the container itself. However, it will be recognized that the necessity of separately filling three separate containers involves a time consuming operation, in addition to the initial necessity of providing the three separate containers and in some manner insuring that the three containers remain together. Further, inasmuch as an anti-coagulant would be desirable in at least one tube as well as the main container, this has been a problem until the present invention.

All of the above difficulties are eliminated in the unique container 10 which comprises the instant invention. This container 10 includes a main blood receiving supply chamber 12, laboratory tube 14 and a pilot tube 16 integrally formed in a single unit. The container 10 is to be preferably formed of a flexible pliable normally clear plastic having the peripheral edges thereof welded or fused in any manner so as to provide a positive seal.

The container 10 is generally rectangular in form with the laboratory and pilot tube portions thereof lying adjacent the longitudinal edges and segregated from the main chamber 12 by longitudinally extending sealed seams 18 and 20 extending from the sealed upper end of the container 10 to a point spaced a sufficient distance from the sealed bottom of the container 10 so as to allow for free communication between the main chamber 12 and each of the tubes 14 and 16.

The seam 18 between the main chamber 12 and the laboratory tube 14 is substantially wider than the seam 20 between the main chamber 12 and the pilot tube 16, and includes a centrally located longitudinally extending line of weakness 22, which may be in the form of minute perforations. In addition, inasmuch as the laboratory tube is to be moved from the main chamber 12 and the pilot tube 16, and handled separately, including possibly a centrifuging operation, this tube 14 is internally rigidified by a relatively rigid hollow plastic cylinder 24 sealed internally therein, this hollow cylindrical portion or reinforcing tube 24 terminating substantially on line with the lower end of the centrally perforated seal 18, so as to not interfere with the free communication between the laboratory tube 14 and the main chamber 12.

A pair of hook-receiving apertures 26 are also provided for suspending the container 10 as needed, these apertures preferably being located adjacent the upper corners of the main chamber 12 and in portions 28 of the container 10 segregated from both the adjacent tube by the tube seam, and from the chamber 12 by an angularly related seam 30.

Communication into the main chamber 12 is had through either one or two capped outlets 32 while the laboratory tube 14 has an elongated tubing 34 extending therefrom, suitably sealed as at 36, the pilot tube 16 being provided with a rubber stopper having a conventional metal seal 38.

As will be appreciated, the container 10 in its unloaded condition is relatively flat, simplifying both the storage and transportaion thereof. Upon being filled, the flexible nature of the container allows it to expand or inflate to the general shape shown in cross-section in FIGURE 6.

Figure 3:
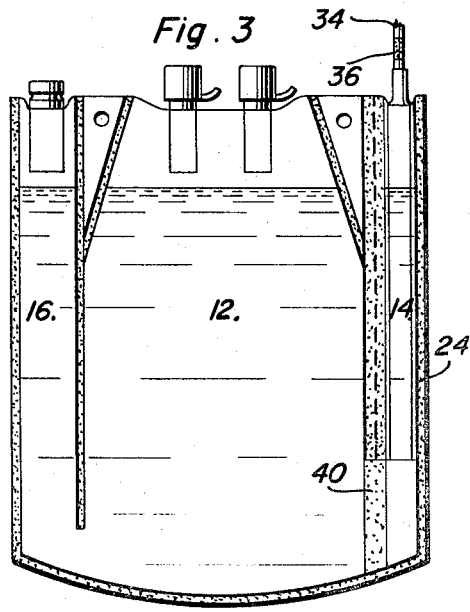
FIGURE 3 is a view of the device subsequent to the sealing off of the laboratory tube.
Figure 4:
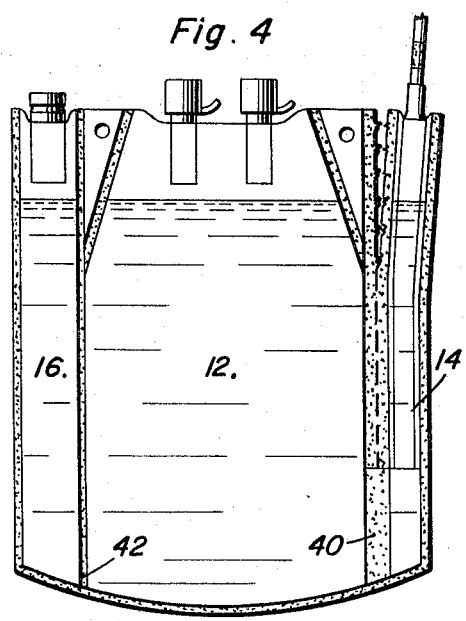
FIGURE 4 is a view of the device subsequent to a sealing off of the pilot tube and a commencing of the removal of the laboratory tube.
Figure 5:
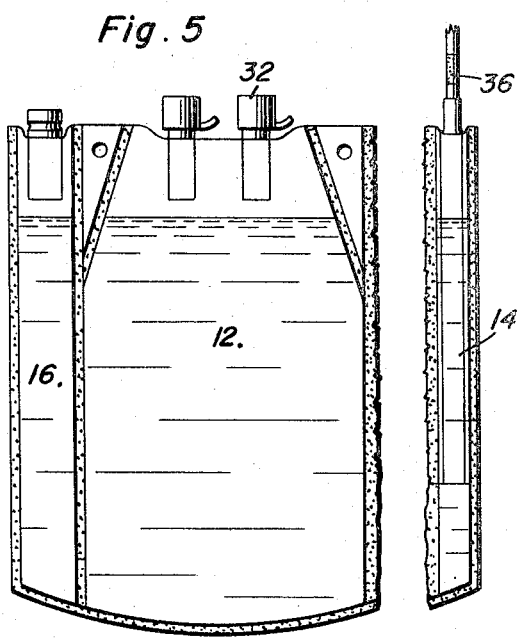
FIGURE 5 is a view of the device with the laboratory tube completely severed therefrom.

In using the container 10 of the instant invention, the blood from the donor is introduced by way of tube 14 and simultaneously flows into the adjoining main chamber 12 and tube 16 through the communicating openings below the tube separating seals 18 and 20. Referring to FIGS. 2–5 sequentially, after the container 10 has been filled, the laboratory tube 14 is completely sealed off from the main chamber 12 by extending the seal 18 to the bottom of the container 10, or in other words, providing an additional seal 40 between the lower end of the seal 18 and the bottom of the container. After the laboratory tube 14 has been completely segregated from the main chamber 12, this tube 14 can be removed at any time for a sampling and classifying of the stored blood, the line of weakness 22 facilitating the severing of this tube 14 with the initial tear easily continuing through the extension seal 40 which is of course made sufficiently wide so as to insure that neither the tube 14 nor the main chamber 12 is unsealed. Further, after the laboratory tube is sealed off, the necesary anticoagulant can be introduced into the main chamber 12, with the open communication between the main chamber and the pilot tube insuring that an equal amount of anticoagulant also be introduced into the pilot tube, thereby providing an exact sampling of the blood which can be checked prior to use without invading the main supply. Once the anticoagulant has been introduced, the pilot tube is also completely sealed off from the main chamber 12 by an extension seal 42 extending from the lower end of the pilot tube seal 20 to the bottom of the container 10, the pilot tube 16 of course always remaining with the main chamber 12.

From the foregoing it will be appreciated that a highly novel blood container has been described, this container eliminating any necessity of providing separate laboratory and pilot tubes, along with the problems incident to separately filling these tubes and insuring that the tubes do not become separated from the main container. This has been done by integrally forming both the main supply receiving chamber and the two tubes in a manner so as to allow for a simultaneous filling of all three and a selective segregation of the tubes from the main chamber while maintaining the integral nature of the overall unit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A device for receiving and storing blood, said device comprising a peripherally sealed container, said container having a top, a bottom and two sides, a pair of elongated seals extending downwardly from the top of the container adjacent, generally parallel to, and inward of the sides of said container so as to form an enlarged central chamber and two smaller side chambers, one of said seals extending to the bottom so as to define a sealed side chamber, the second seal terminating in spaced relation above the bottom so as to provide communication between the corresponding side chamber and the central chamber, and means enabling a severance of the sealed side chamber from the central chamber while maintaining the sealed nature of both.

References Cited by the Examiner
UNITED STATES PATENTS

| | | | |
|---|---|---|---|
| 2,958,169 | 11/1960 | Flax | 53—37 |
| 2,990,101 | 6/1961 | Mead | 229—53 |
| 2,998,340 | 8/1961 | Conway. | |
| 3,028,863 | 4/1962 | Mattson. | |
| 3,074,450 | 1/1963 | Wilkaitis | 150—1 |
| 3,078,895 | 2/1963 | Silver | 150—1 |
| 3,187,750 | 6/1965 | Tenczar | 128—214 XR |
| 3,204,855 | 9/1965 | Boynton | 150—1 XR |
| 3,206,908 | 9/1965 | Bodet | 53—37 |
| 3,209,752 | 10/1965 | Bujan | 215—38 XR |

JOSEPH R. LECLAIR, *Primary Examiner.*

D. F. NORTON, *Assistant Examiner.*